United States Patent [19]
Foxworthy et al.

[11] Patent Number: 4,672,613
[45] Date of Patent: Jun. 9, 1987

[54] SYSTEM FOR TRANSFERRING DIGITAL DATA BETWEEN A HOST DEVICE AND A RECORDING MEDIUM

[75] Inventors: Neal E. Foxworthy, Solana Beach; William S. Clark, Jr., Escondido; Stephen R. Schossow; Robert J. Gabbay, both of San Diego, all of Calif.

[73] Assignee: Cipher Data Products, Inc., San Diego, Calif.

[21] Appl. No.: 794,070

[22] Filed: Nov. 1, 1985

[51] Int. Cl.⁴ ............................................. G06F 11/10
[52] U.S. Cl. ...................................... 371/38; 364/200
[58] Field of Search .................... 371/38; 364/200, 900

[56] References Cited

U.S. PATENT DOCUMENTS

4,488,228 12/1984 Crudele et al. ...................... 364/200
4,525,839 6/1985 Nozawa et al. ......................... 371/38

Primary Examiner—Charles E. Atkinson
Attorney, Agent, or Firm—Baker, Maxham & Jester

[57] ABSTRACT

In a system for transferring data between a host device and a target recording medium, a buffer interface control unit includes a host direct memory access (DMA) unit for transferring data from the host unit to a buffer memory. The host DMA unit accesses a first set of prescribed noncontinuous buffer memory storage locations to store the data transferred from the host unit in a predetermined buffer format that includes additional sets of prescribed storage locations interspersed with the first set of data storage locations for the storage of error code characters pertaining to the data. The host DMA unit also transfers error correction code characters pertaining to the data to one of the additional sets of prescribed storage locations. The buffer interface control unit further includes a target DMA unit for transferring data from the buffer memory to a write interface unit. The target DMA unit accesses the buffer memory storage locations in a predetermined noncontinuous sequence in order to retrieve the data from the buffer memory in a format that includes open time slots interspersed with time slots occupied by the retrieved data for the insertion of error detection code characters pertaining to the data retrieved from the buffer memory.

21 Claims, 7 Drawing Figures

SYSTEM FOR TRANSFERRING DIGITAL DATA BETWEEN A HOST DEVICE AND A RECORDING MEDIUM

BACKGROUND OF THE INVENTION

The present invention generally pertains to electronic data processing systems and is particularly directed to a system for transferring digital data between a host device, such as a computer, and a recording medium.

It is common to transfer data accumulated in a computer to a back-up recording medium, such as a recording tape or a disk, when the computer is to be used for tasks not requiring such data. When such data is again required, it is transferred back to the computer from the recording medium.

Typically such a data transfer system includes a buffer memory having a matrix of storage locations for storing digital data; a write interface unit for transferring data to a target recording medium for recording; a read interface unit for reading and processing data from a target recording medium; and a buffer interface control unit for transferring data between the host device and the buffer memory, for transferring data from the buffer memory to the write interface unit during a writing mode of operation, and for transferring data from the read interface unit to the buffer memory during a retrieval mode of operation. The data transfer between the host device and the buffer memory is asynchronous with the data transfer between the buffer memory and the write and read interface units.

During the course of transferring the data from the host unit to the target recording medium and then back to the host unit errors are sometimes induced in the data. To provide for the correction of such errors, error detection code characters and error correction code characters are calculated for the data and interspersed with and recorded with the data on the target recording medium in accordance with a predetermined recording format. During the retrieval mode, the data read by the read interface unit is processed in accordance with the recorded error detection code characters to detect any errors in the read data. When errors are detected they are corrected in accordance with the recorded error correction code characters.

It is the object of the present invention to provide a data transfer system that efficiently transfers data for recording in a format wherein the data is interspersed with error detection code characters and error correction code characters pertaining to the transferred data.

SUMMARY OF THE INVENTION

The present invention provides a data transfer system that efficiently transfers data for recording in a format wherein the data is interspersed with error detection code characters and error correction code characters. In the data transfer system of the present invention the buffer interface control unit includes means for generating error correction code characters pertaining to the data as the data is being transferred to the buffer memory; a host direct memory access (DMA) unit for transferring the data from the host unit to the buffer memory, and for transferring the generated error correction code characters to the buffer memory; and a target DMA unit for transferring the data and the error correction codes from the buffer memory to the write interface unit. The host DMA unit includes means for accessing a first set of prescribed noncontinuous buffer memory storage locations during the writing mode of operation in order to store the data transferred from the host unit in the buffer memory in a predetermined buffer format that includes additional sets of prescribed storage locations interspersed with the first set of data storage locations for the storage of error code characters pertaining to the data, and means for accessing one of the additional sets of prescribed storage locations during the writing mode of operation in order to store the error correction code characters so that they are interspersed with the data in the predetermined buffer format; and the target DMA unit includes means for accessing the first set and the one additional set of prescribed buffer memory storage locations in a predetermined noncontinuous sequence in order to retrieve the data and the error correction code characters from the buffer memory in a format that includes open time slots interspersed with time slots occupied by the retrieved data and error correction code characters for the insertion of error detection code characters pertaining to the retrieved data and error correction code characters.

Additional features of the present invention are described with reference to the description of the preferred embodiment.

DESCRIPTION OF THE PREFERRED EMBODIMENT

Figure 1:
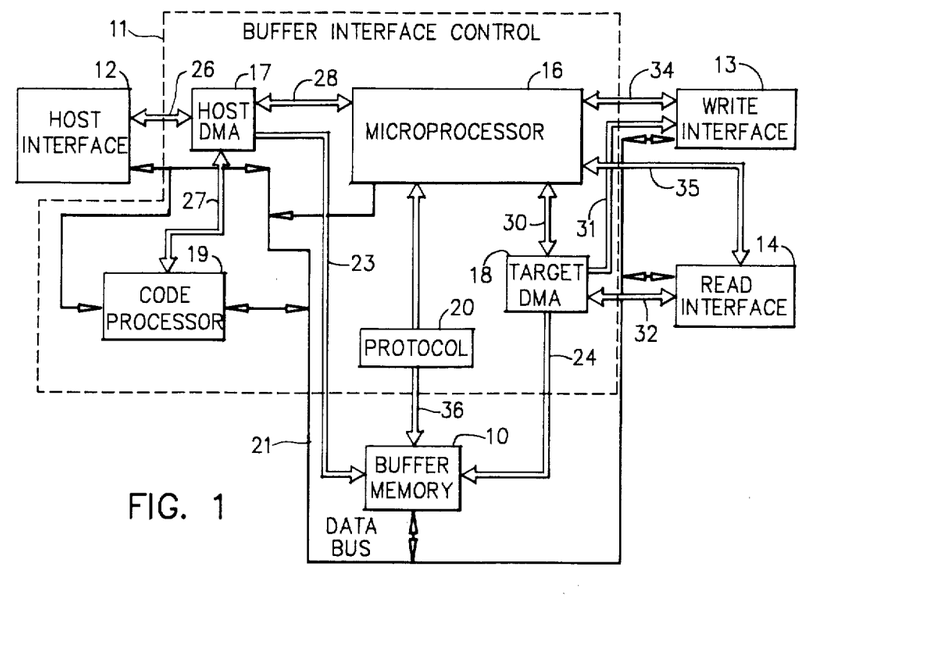
FIG. 1 is a block diagram of a preferred embodiment of the data transfer system of the present invention.

Referring to FIG. 1, a preferred embodiment of the system of the present invention includes a buffer memory 10, a buffer interface control unit 11, a host interface unit 12, a write interface unit 13, and a read interface unit 14. The buffer interface control unit 11 includes a microprocessor 16, a host DMA unit 17, a target DMA unit 18, a code processor 19, a protocol unit 20, and a data bus 21. The host DMA unit 17 transfers over the data bus 21 data between the host interface unit 12 and the buffer memory 10, from the microprocessor 16 to the buffer memory 10, and from the code processor 19 to the buffer memory 10. The target DMA unit 18 transfers data over the data bus 21 from the buffer memory 10 to the write interface unit 13, and from the read interface unit 14 to the buffer memory 10.

The host DMA unit 17 accesses the buffer memory 10 over address lines 23. The target DMA unit 18 accesses the buffer memory 10 over address lines 24.

The host DMA unit 17 is coupled to the host interface unit 12 by control lines 26. The host DMA unit 17 is coupled to the code processor 19 by control lines 27.

The host DMA unit 17 is coupled to the microprocessor 16 by control lines 28.

The target DMA unit 18 is coupled to the microprocessor 16 by control lines 30. The target DMA unit 18 is coupled to the write interface unit 13 by control lines 31. The target DMA unit 18 is coupled to the read interface unit 14 by control lines 32.

The microprocessor 16 is coupled to the write interface unit 13 by control lines 34. The microprocessor 16 is connected to the read interface unit 14 by control lines 35. The microprocessor 16 is coupled to the buffer memory 10 via the protocol unit 20 by a CPU channel 36.

The buffer memory 10 includes an arbitration unit and a multiplexer to establish priority between and access only one of the address lines 23, the address lines 24 or the CPU channel 36 at any one time.

The host interface unit 12 is either a Small Computer System Interface (SCSI) unit or a QIC-02 interface unit, both of which are well known to those familiar with the pertinent art.

Figure 2:
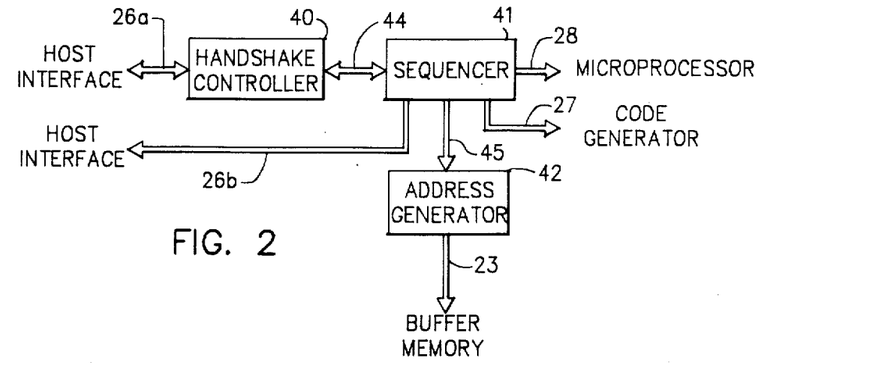
FIG. 2 is a block diagram of the host DMA unit included in the system of FIG. 1.

Referring to FIG. 2, the host DMA unit includes a handshake controller 40, a sequencer 41 and an address generator 42. The handshake controller 40 communicates with the sequencer 41 via control lines 44 and with the host interface unit 12 via control lines 26. The sequencer 41 communicates with the address generator 42 via control lines 45 and with the microprocessor 16 via control lines 28. The address generator 42 provides addresses on lines 23 to the buffer memory 10.

Figure 3:
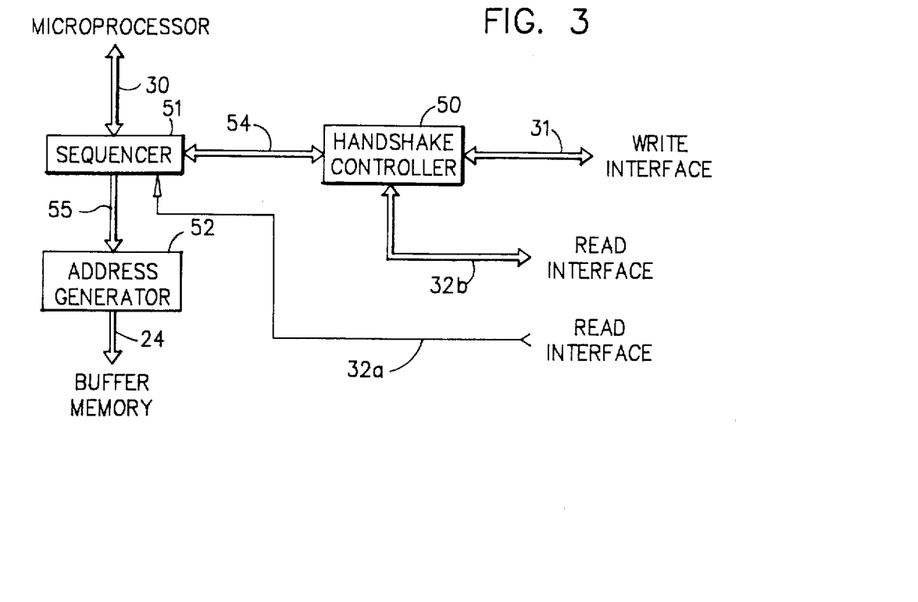
FIG. 3 is a block diagram of the target DMA unit included in the system of FIG. 1.

Referring to FIG. 3, the target DMA unit includes a handshake controller 50, a sequencer 51 and an address generator 52. The handshake controller communicates with the sequencer 51 via control lines 54, with the write interface unit 13 via control lines 31, and with the read interface unit 14 via control lines 32. The sequencer communicates with the address generator 52 via control lines 55 and with the microprocessor 16 via control lines 30. The address generator 52 provides addresses to the buffer memory 10 via address lines 24.

Figure 4:
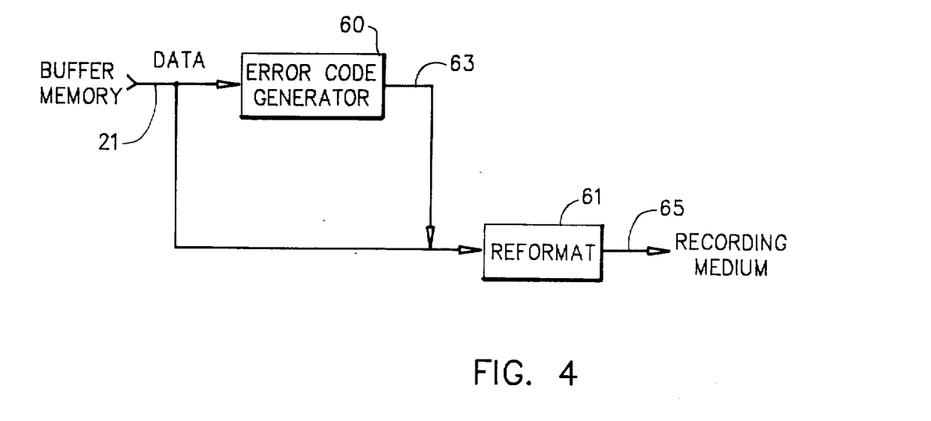
FIG. 4 is a block diagram of the write interface unit included in the system of FIG. 1.

Referring to FIG. 4, the write interface unit includes an error code generator 60 and a reformatting unit 61.

Figure 5:
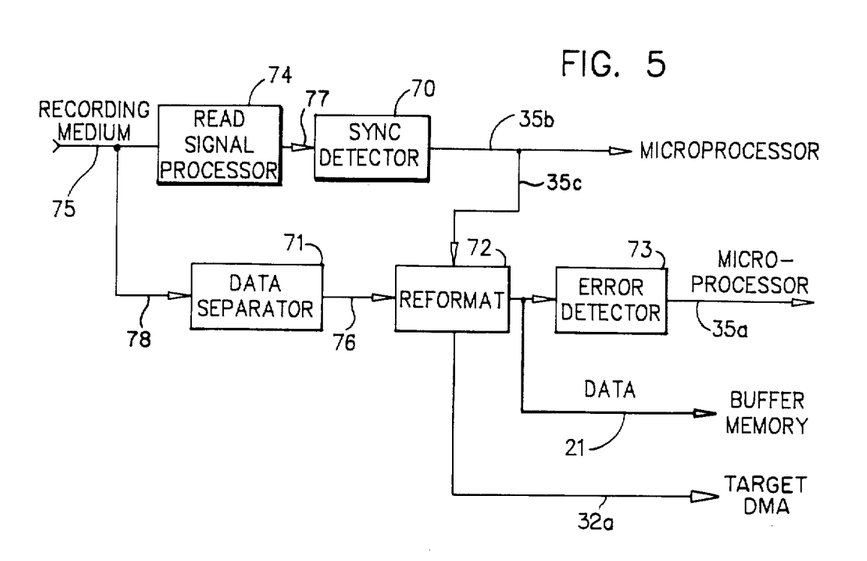
FIG. 5 is a block diagram of the read interface unit included in the system of FIG. 1.

Referring to FIG. 5, the read interface unit includes a sync detector 70, a data separator 71, a reformatting unit 72, an error detector 73 and a read signal processor 74.

Figure 6:
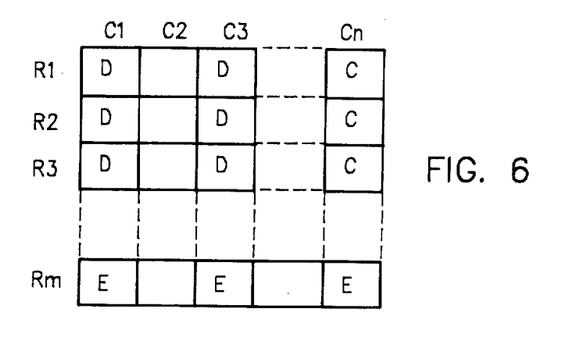
FIG. 6 illustrates a data storage format for the buffer memory utilized in a preferred implementation of the system of FIG. 1.

The buffer memory 10 includes a storage matrix including rows and columns of storage locations as shown in FIG. 6. There are m rows R1, R2, R3, . . . , Rm; and n columns C1, C2, C3, . . . , Cn in the matrix.

During the writing mode of operation, the sequencer 41 responds to an initialization signal over control lines 28 from the microprocessor 16 by providing control signals on lines 44 to the handshake controller 40, on lines 26b to the host interface unit 12 and on lines 45 to the address generator 42. The handshake controller 40 is enabled by the control signals over lines 44 from the sequencer 41 and exchanges request and acknowledge signals over lines 26a with the host interface unit 12 as data is transferred by the host interface unit 12 from the host device to the buffer memory 10. The host interface unit 12 responds to the control signals on lines 26b from the sequencer 41 by commencing the transfer of data over data bus 21 from the host device to the buffer memory 10. The address generator 42 responds to the control signals on lines 45 from the sequencer 41 by accessing the buffer memory 10 with a predetermined sequence of address signals over address lines 23 to cause the data transferred from the host interface unit 12 to the buffer memory 10 via data bus 21 to be stored in a first set of prescribed noncontinuous buffer memory storage locations in a predetermined buffer format that includes additional sets of storage locations interspersed with the first set of data storage locations for the storage of error code characters pertaining to the data.

Referring FIG. 6, in an exemplary buffer format, the data is stored in a first set of prescribed storage locations designated by reference letter "D"; and the interspersed additional sets of prescribed storage locations includes row Rm and column C2.

As each block of data is being transferred over data bus 21 from the host interface unit 12 to the buffer memory 10, the code processor 19 monitors the data on data bus 21 and generates error correction code characters pertaining to the data.

During the transfer of the block of data to the buffer memory 10 from the host interface unit 12, the sequencer 41 provides control signals on lines 27 to the code processor 19 and on lines 45 to the address generator 42 to cause the code processor 19 to place the generated error correction code characters onto the data bus 21 and to cause the address generator 42 to access the buffer memory 10 over address lines 23 to cause the error code characters generated by the code processor 19 to be stored in those storage locations designated by the letter "E" in the predetermined buffer format (FIG. 6). The error correction code characters stored in row Rm of each column containing data pertain to the data stored in the data storage locations D in the respective column.

After the transfer of the data and the error correction code characters to the buffer memory 10 from the code processor 19 is completed, the sequencer 41 provides control signals on lines 28 to the microprocessor 16 and on lines 45 to the address generator 42 to cause the microprocessor 16 to place control information onto the data bus 21 and to cause the address generator 42 to access the buffer memory with a third set of address signals over address lines 23 to cause the control information provided by the microprocessor 16 to be stored in additional prescribed storage locations designated by the letter "C" within the predetermined buffer format (FIG. 6). The control information is generated by the microprocessor 16 and pertains to the overall management of the predetermined format of data and interspersed error characters.

The sequencer 41 then provides control signals over lines 27 to the code processor 19 and over lines 45 to the address generator 42 to cause the code processor 19 to generate CRC characters pertaining to the block of data, error correction code characters and control information in the buffer format and to effect the storage of the generated CRC characters in the storage location denoted by row Rm of column Cn.

Also during the writing mode of operation, the sequencer 51 of the target DMA unit 18 responds to an initialization signal over control lines 30 from the microprocessor 16 by providing control signals on lines 54 to the handshake controller 50, and on lines 55 to the address generator 52. The handshake controller 50 is enabled by the control signals over lines 54 from the sequencer 51 and exchanges request and acknowledge signals over lines 31 with the write interface unit 13 as data is transferred to the write interface unit 13 from the buffer memory 10. The address generator 52 responds to the control signals on lines 55 from the sequencer 51 by accessing the buffer memory 10 with a predetermined noncontinuous sequence of address signals over address lines 24 in order to retrieve the stored data, error correction code characters and control information from the buffer memory 10 and to cause the retrieved data, error correction code characters and control information to be transferred from the buffer memory 10 to the write interface unit 13 via the data bus 21.

Figure 7:
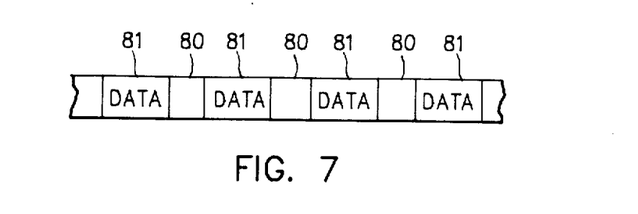
FIG. 7 illustrates a sequence used for transferring data from the buffer memory to the write interface unit in a preferred implementation of the system of FIG. 1.

The sequencer 51 causes the address generator 52 to access the buffer memory in a sequence that causes the data, error code characters and control information to be retrieved from the buffer memory 10 in a format that includes open time slots 80 interspersed with time slots 81 occupied by the data, error code characters and control information, as shown in FIG. 7.

The target DMA unit 17 can be adapted to transfer the data, error code characters and control information from the buffer memory 10 to the write interface unit 13 in either the same or a different order than the order in which the data, error code characters and control information were transferred to the buffer memory 10 by the host DMA unit 17.

In one preferred embodiment, the sequencer 41 of the host DMA unit 17 causes the address generator 42 to access the storage locations of the buffer memory 10 in a column-by-column sequence to store the data transferred from the host unit, the error code characters transferred from the code processor 19 and the control information transferred from the microprocessor 16; and the sequencer 51 of the target DMA unit 18 causes the address generator 52 to access the storage locations of the buffer memory 10 in a row-by-row sequence in order to retrieve the data, error code characters and control information for transfer to the write interface unit 13. Alternatively, the sequencer 41 of the host DMA unit 17 and the sequencer 51 of the target DMA unit 18 can be adapted to cause the respective address generators 42, 52 to access the storage locations of the buffer memory 10 other combinations of row-by-row and column-by-column sequences in accordance with the particular data recording format that is being used.

As the data, error code characters and control information are transferred into the write interface unit 21 from the buffer memory 10, the error code generator 60 of the write interface unit 13 generates error detection code characters pertaining to such transferred data and provides such generated error detection code characters on bus 63. The write interface unit 13 inserts the generated error detection code characters provided from the error code generator 60 on bus 63 into the open time slots 80 interspersed with the time slots 81 occupied by the data, error code characters and control information transferred from the buffer memory 10 on data bus 21 for transfer to the reformatting unit 61.

The reformatting unit 61 processes the data, error code characters and control information transferred from the buffer memory 10 and the interspersed error detection code characters provided by the error code generator 60 for transfer to the target recording medium via line 65 in a predetermined data recording format that includes data sectors separated by synchronization code characters and containing resynchronization code characters at different positions within each sector. Each data sector also includes various combinations of data, error code characters and control information in accordance with the order in which such was retrieved from the buffer memory and/or inserted in the open time slots.

The read interface unit 14 reads whatever is recorded on the recording medium. The signal read from the recording medium on line 75 is conditioned for processing by the read signal processor 74 and provided on line 77 to the sync detector 70. The signal read from the recording medium on line 75 is also provided to the data separator 71 in the read interface unit on line 78, as shown in FIG. 5. The sync detector 70 detects synchronization code characters in the read signal on line 77 and provides a signal on line 35b to the microprocessor 16 to indicate whether a synchronization code character has been detected. The reformatting unit 72 detects the resynchronization code characters in the read signal on line 35c, and provides a loss of synchronization signal on line 32a to the sequencer 51 in the target DMA unit to indicate that a resynchronization code character was not detected when it was supposed to be detected. When a resynchronization code character subsequently is detected when it is supposed to be detected, the loss of synchronization signal on line 32a to the sequence 51 is removed. The data separator 71 separates the data sectors from the synchronization code characters in the read signal on line 78 and provides the separated data sectors on line 76 to the reformatting unit 72. The reformatting unit 72 reformats the data sectors, for which a synchronization detection signal is provided to the reformatting unit on line 35c into the same format as they were converted from by the reformatting unit 61 in the write interface unit of FIG. 4. The reformatting unit 72 provides the reformatted data error code characters and control information to the error detector 73. The error detector 73 processes the data from the reformatting unit 72 in accordance with the error code characters from the reformatting unit 72 in order to detect any errors in the data. When an error is detected an error indication signal is provided on line 35a to the microprocessor 16 to indicate the sector of data in which the error was detected.

The read interface unit 14 reads whatever is being recorded on the recording medium by the write interface unit 13 while recording is taking place. As stated above, when an error in recording is detected by the error detector 73, a signal indicating the data sector in which the error occurred is provided on line 35a to the microprocessor 16. The microprocessor 16 generates control information pertaining to such error-indicated sector indicating that the sector of data is being rerecorded, recalculates the error correction code characters pertaining to such sector and the CRC characters pertaining to the block of data and accesses the buffer memory 10 via the CPU channel 36 to store the generated control information and the recalculated code characters in appropriate storage locations in the buffer memory 10. The microprocessor 16 then sends a signal on lines 30 to the sequencer 51 of the target DMA unit 18, which causes the sequencer 51 to send control signals on lines 55 to the address generator 52 to cause the address generator 52 to again access the buffer memory storage locations from which the error-indicated sector was retrieved so as to again retrieve the error-indicated sector of data for transfer to the write interface unit 13. The error code generator 60 then recalculates new error detection code characters for the sector of data that is being rerecorded and provides the recalculated error detection code characters on line 63 for insertion into the open time slot on data bus 21. The reformatting unit 61 then reformats the data sector for recording, and the data sector is rerecorded on the recording medium.

During the retrieval mode of operation, the target DMA unit 18 transfers the data, error code characters and control information read by the read interface unit and reformatted by the reformatting unit 72 over the data bus 21 to the buffer memory 10 for storage in the same buffer format during the retrieval mode of operation as the buffer format such data, error code characters and control information were retrieved from by the target DMA unit 18 during the writing mode of operation, as shown in FIG. 6. The error detection code characters generated and inserted by the write interface control unit 13 are transferred by the target DMA unit 18 for storage in column C2 of the storage locations in the buffer memory 10 shown in FIG. 6.

Accordingly, during the retrieval mode of operation, the sequencer 41 responds to an initialization signal over control lines 30 from the microprocessor 16 by providing control signals on lines 54 to the handshake controller 50, and on lines 55 to the address generator 52. The handshake controller 50 is enabled by the control signals over lines 54 from the sequencer 51 and exchanges request and acknowledge signals over lines 32b with the read interface unit 14 as data is transferred from the read interface unit 14 to the buffer memory 10. The address generator 52 responds to the control signals on lines 55 from the sequencer 51 by accessing the buffer memory 10 with a predetermined sequence of address signals over address lines 24 to cause the data, error code characters and control information transferred from the read interface unit 14 to the buffer memory 10 via data bus 21 to be stored in the same buffer format as retrieved from by the target DMA unit 18 during the writing mode of operation. The data, error code characters and control information are stored in the buffer memory 10 in a row-by-row order with the data being stored in the storage locations indicated by the letter D, the error correction code characters that were generated by the code processor 19 being stored in the storage locations indicated by the letter E in all columns except column Cn, the control information that was provided by the microprocessor 16 being stored in the storage locations indicated by the letter C and the error detection code characters that were generated by the error code generator 60 being stored in column C2 of the storage locations. Although the buffer format is the same for both retrieval and storage of data, etc. transferred from and to the buffer memory 10 by the target DMA unit 18, the data, etc. are not necessarily stored in the same physical storage locations as they were retrieved from. The data, etc. are stored in storage locations in the buffer format corresponding to the storage locations that they were retrieved from.

As the data, error code characters and control information are stored in the buffer memory during the retrieval mode of operation, the microprocessor 16 accesses the stored control information via the CPU channel 36 and processes the same.

When the microprocessor 16 detects control information indicating that a sector of data has been rerecorded, the microprocessor provides control signals to the target DMA unit 18 via lines 30 that cause the target DMA unit 18 to access the storage locations in the buffer memory 10 in a predetermined sequence that is dependent upon the rerecorded-sector indication to ultimately store the sector of rerecorded data instead of the erroneously recorded sector of data in the storage locations of the predetermined buffer format corresponding to the storage locations that the rerecorded sector of data was retrieved from during the writing mode of operation.

As described above, during the retrieval mode of operation, the sync detector 70 in the read interface unit 14 provides a signal on line 35b to the microprocessor 16 indicating whether the synchronization code characters pertaining to a given data sector are detected in the signal on line 77. The microprocessor 16 monitors this synchronization indication signal on line 35b and provides control signals on lines 30 to the target DMA unit 18 in accordance with such indications. The microprocessor 16 provides a synchronization indication to the target DMA unit 18 for those sectors for which the synchronization code characters are detected and provides a loss of synchronization indication to the target DMA unit 18 when synchronization code characters are not detected when they should be detected. The target DMA unit responds to the synchronization indication by transferring the data, etc. from the read interface unit 14 to the buffer memory 10. The target DMA unit 18 responds to the loss of synchronization indication by interrupting all transfer from the read interface unit 14 to the buffer memory 10. The target DMA unit 18 responds to an indication on line 32a that a resynchronization code character was not detected when it was supposed to be detected by interrupting all transfer from the read interface unit to the buffer memory, and further responds to a subsequent indication on line 32a that a resynchronization code character was detected when it was supposed to be detected by resuming transfer of the remainder of the data in the sector to the storage locations in the buffer format corresponding to the storage locations that the data was retrieved from during the writing mode of operation.

Also as described above, during the retrieval mode of operation, the error detector 73 in the read interface unit 14 provides a signal on line 35a to the microprocessor 16 whenever an error is detected in a read sector of data to indicate the sector of data in which the error was detected. Such sector of data is transferred to the buffer memory 10 by the target DMA unit 18 notwithstanding the detection of the error therein, since it is possible to correct many errors by error-correction processing techniques well known to those skilled in the art. The microprocessor 16 responds to the error-indication signal on line 35a during the retrieval mode of operation by retrieving the indicated sector from the buffer memory 10 via the CPU channel 36, by processing the retrieved sector in accordance with the error codes included therein to correct the error, and by transferring the corrected sector to the buffer memory 10 via the CPU channel 36 for storage in the same storage locations that the error-indicated sector was retrieved from.

Further during the normal retrieval mode of operation, the microprocessor 16 causes the host DMA unit 17 to retrieve each block of data from the buffer memory 10 for transfer to the host unit in the same format as the data was transferred by the host DMA unit 17 to the buffer memory 10 during the writing mode of operation. Only the data stored in the buffer memory 10 is transferred by the host DMA unit 17 to the host unit. The CRC characters are retrieved from the buffer memory 10 by the host DMA unit 17 and utilized by the code processor 19 to detect errors in the data being transferred to the host unit. If an error is detected, the code processor 19 provides a signal to the microprocessor 16 via the host DMA unit 17 to indicate the block of data in which the error was detected. The microprocessor 16 responds to the error indication from the code processor 19 by providing a signal to the host unit indicating that the transferred block of data contains an error and/or by causing the host DMA unit to retransfer the data to the host unit. During the retrieval mode of operation, the microprocessor 16 retrieves the control information from the buffer memory 10 via CPU channel 36 and processes the control information to assure that the data is correctly formatted for transfer to the host unit. The error code characters and the control information pertaining to the block of retrieved data are retrieved from the buffer memory 10 by the microprocessor 16 prior to the retrieval of the data from the buffer memory 10.

To complete the transfer of data during the retrieval mode of operation, the sequencer 41 responds to an initialization signal over control lines 28 from the microprocessor 16 by providing control signals on lines 44 to the handshake controller 40, on lines 26b to the host interface unit 12 and on lines 45 to the address generator 42. The handshake controller 40 is enabled by the control signals over lines 44 from the sequencer 41 and exchanges request and acknowledge signals over lines 26a with the host interface unit 12 as data is transferred by the host interface unit 12 to the host device from the buffer memory 10. The host interface unit 12 responds to the control signals on lines 26b from the sequencer 41 by commencing the transfer of data over data bus 21 to the host device from the buffer memory 10. The address generator 42 responds to the control signals on lines 45 from the sequencer 41 by accessing the buffer memory 10 with a predetermined sequence of address signals over address lines 23 in order to retrieve the stored data from the buffer memory 10 and to cause the retrieved data to be transferred from the buffer memory 10 to the host interface unit 12 via the data bus 21 for transfer to the host unit.

During the writing mode of operation, all recording on the recording medium is accomplished in a nominal forward direction. On occasion there is a requirement to transfer the data to the host unit during the retrieval mode of operation in a direction opposite to the direction in which the data was recorded during the writing mode of operation. Accordingly, the microprocessor 16 responds to such a reverse-direction indication by selectively generating control information indicating that data is to be read from the target recording medium during the retrieval mode of operation in the reverse direction in relation to the forward direction in which the data was recorded during the writing mode of operation. The microprocessor provides reverse-direction control information to the read interface unit via lines 35, to the target DMA unit via lines 30, and to the host DMA unit 17 via lines 28. The read interface unit 14 responds to the reverse-direction control information by reading the recording medium in the reverse direction during the retrieval mode of operation. However, it is desirable that the data be stored in the buffer memory during the retrieval mode of operation in the same format as stored during the writing mode of operation so that errors that may occur can be detected in response to the detection thereof and corrected by the microprocessor 16, as described above. Therefore, the target DMA unit 18 accesses the corresponding first set of prescribed buffer memory storage locations in the buffer memory 10 in a predetermined sequence that is dependent upon the reverse-direction control information in order to store the data in the same format that the data would have been stored in if the data had been read from the recording medium in the forward direction. Accordingly, in order to transfer the data in the reverse direction to the host unit, the host DMA unit 17 accesses the corresponding first set of prescribed buffer memory storage locations in in the buffer memory 10 in a predetermined sequence that is dependent upon the reverse-direction control information in order to transfer data from the buffer memory 10 for transfer to the host device during the retrieval mode of operation in the reverse order from the order that the data was transferred by the host DMA unit 17 to the buffer memory 10 during the writing mode of operation.

The system of the present invention has been described herein with reference to exemplary preferred embodiments of data buffer storage and transfer formats. The system of the present invention is also useful for transferring data between a host unit and a recording medium in accordance with other formats for buffer storing and transferring the data, as will be apparent to those skilled in the art.

We claim:

1. A system for transferring digital data between a host device and a target recording medium, comprising
a buffer memory having a matrix of storage locations for storing digital data;
a write interface unit for transferring data to a target recording medium for recording;
a read interface unit for reading and processing data from a target recording medium; and
a buffer interface control unit for transferring data from the host device to the buffer memory and from the buffer memory to the write interface unit during a writing mode of operation, and for transferring data from the read interface unit to the buffer memory and from the buffer memory to the host device during a retrieval mode of operation, wherein the buffer interface control unit comprises
means for generating error correction code characters pertaining to said data as said data is being transferred to the buffer memory; and
a host direct memory access (DMA) unit for transferring the data from the host unit to the buffer memory, and for transferring the generated error correction code characters to the buffer memory; and
a target DMA unit for transferring the data and the error correction codes from the buffer memory to the write interface unit;
wherein the host DMA unit includes means for accessing a first set of prescribed noncontinuous buffer memory storage locations during the writing mode of operation in order to store the data transferred from the host unit in the buffer memory in a predetermined buffer format that includes additional sets of prescribed storage locations interspersed with the first set of data storage locations for the storage of error code characters pertaining to said data, and means for accessing one of the additional sets of prescribed storage locations during the writing mode of operation in order to store the error correction code characters so that they are interspersed with the data in the predetermined buffer format; and
wherein the target DMA unit includes means for accessing the first set and the one additional set of prescribed buffer memory storage locations in a predetermined noncontinuous sequence in order to retrieve the data and the error correction code characters from the buffer memory in a format that includes open time slots interspersed with time slots occupied by the retrieved data and error correction code characters for the insertion of error detection code characters pertaining to the retrieved data and error correction code characters.

2. A system according to claim 1,
wherein the buffer interface control unit further comprises means for generating error control information pertaining to said data as said data is being transferred to the buffer memory; and
wherein the host direct memory access (DMA) unit further comprises means for transferring the generated control information to the buffer memory, said transferring means including means for accessing another set of prescribed storage locations in the buffer memory during the writing mode of operation in order to store the control information with the data in the predetermined buffer format.

3. A system according to claim 1,
wherein the target DMA unit includes means for transferring the data from the buffer memory to the write interface unit in an order different than the order in which the data was transferred to the buffer memory by the host DMA unit.

4. A system according to claim 3,
wherein the buffer memory includes a storage matrix comprising columns and rows of storage locations;
wherein the host DMA unit includes means for accessing the storage locations of the buffer memory in a column-by-column sequence in order to store the data transferred from the host unit; and
wherein the target DMA unit includes means for accessing the storage locations of the buffer memory in a row-by-row sequence in order to retrieve the data from the buffer memory for transfer to the write interface unit.

5. A system according to claim 1,
wherein the write interface unit comprises means for generating error detection code characters pertaining to said retrieved data and error correction code characters, means for inserting said generated error detection code characters in said open time slots, and and means for processing the interspersed data and error code characters for transfer to the target recording medium in a predetermined data recording format.

6. A system according to claim 5,
wherein the target DMA unit includes means for transferring the data read and error correction code characters by the read interface unit to the buffer memory for storage in the same buffer format during the retrieval mode of operation as the buffer format said data and error correction code characters were retrieved from by the target DMA unit during the writing mode of operation, and means for transferring error detection code characters read by the read interface unit during the retrieval mode of operation to the buffer memory for storage in another of the additional sets of prescribed storage locations within said buffer format.

7. A system according to claim 5,
wherein said predetermined data recording format includes sectors of data separated by synchronization code characters that indicate respectively adjacent data sectors;
wherein the read interface unit comprises means for reading whatever is being recorded on the target recording medium while recording is taking place, means for processing error detection code characters read from the recording medium to detect errors in recording, and means responsive to the read synchronization code characters for indicating sectors in which a recording error is detected;
wherein the target DMA unit comprises means that respond to said sector-error indication during the writing mode of operation by again transferring to the write interface unit from the buffer memory the sector of data for which the error was indicated; and
wherein the buffer interface control unit further comprises means that respond to said sector-error indication by accessing said buffer memory and inserting control information in said sector of again-transferred data indicating that said sector is being rerecorded on said target recording medium.

8. A system according to claim 7,
wherein the target DMA unit includes means for transferring the data read by the read interface unit to the buffer memory for storage in the same buffer format during the retrieval mode of operation as the buffer format said data was retrieved from by the target DMA unit during the writing mode of operation, and means for accessing the corresponding first set of prescribed buffer memory storage locations in a predetermined sequence that is dependent upon said rerecorded-sector indication to ultimately store the sector of rerecorded data instead of the erroneously recorded sector of data in the storage locations of said buffer format corresponding to the storage locations that said rerecorded data was retrieved from during the writing mode of operation.

9. A system according to claim 5,
wherein said predetermined data recording format includes sectors of data separated by synchronization code characters that indicate respectively adjacent data sectors;
wherein the read interface unit comprises means for processing error detection code characters read from the recording medium during the retrieval mode to detect errors in recording, and means responsive to the read synchronization code characters for indicating sectors in which a recording error is detected;
wherein the target DMA unit includes means for transferring data read by the read interface unit to the buffer memory for storage in the same buffer format during the retrieval mode of operation as the buffer format said data was retrieved from by the target DMA unit during the writing mode of operation; and
wherein the buffer interface control unit further comprises means that respond to said sector-error indication during the retrieval mode of operation by retrieving from the buffer memory each sector of data for which said sector-error was indicated, by processing said retrieved data sector to correct said error, and by storing said corrected data sector in the buffer memory in the same storage locations that the error-indicated data sector was retrieved from.

10. A system according to claim 5, wherein said predetermined data recording format includes sectors of data separated by synchronization code characters and containing resynchronization code characters at different positions within each sector;

wherein the buffer interface control unit further comprises means for monitoring said synchronization code character detection indications during the retrieval mode of operation, and means for responding to said monitoring by providing a synchronization indication for those sectors for which the synchronization code characters are detected and by providing a loss of synchronization indication when synchronization code characters are not detected when they should be detected; and 11. A system according to claim 1, wherein the target DMA unit includes means for transferring data read by the read interface unit to the buffer memory for storage in the same format during the retrieval mode of operation as the format said data was transferred from by the target DMA unit during the writing mode of operation.

12. A system according to claim 11, wherein the buffer interface control unit further comprises means for selectively generating control information indicating that data is to be read from the target recording medium during the retrieval mode of operation in the reverse direction in relation to a forward direction in which the data was recorded during the writing mode of operation;

wherein the read interface unit includes means that respond to said reverse-direction control information by reading the recording medium in said reverse direction during the retrieval mode of operation;

wherein the target DMA unit includes means for accessing the corresponding first set of prescribed buffer memory storage locations in a predetermined sequence that is dependent upon said reverse-direction control information in order to store the data in the same format that said data would have been stored in if the data had been read from the recording medium in the forward direction; and wherein the host DMA unit includes means for accessing the corresponding first set of prescribed buffer memory storage locations in a predetermined sequence that is dependent upon said reverse-direction control information in order to transfer data from the buffer memory for transfer to said host device during the retrieval mode of operation in the reverse order from the order that said data was transferred by the host DMA unit to the buffer memory during the writing mode of operation.

13. A system according to claim 1, wherein the host DMA unit includes means for transferring data from the buffer memory for transfer to host unit during the retrieval mode of operation in the same format as said data was transferred by the host DMA device to the buffer memory during the writing mode of operation.

14. A system for transferring digital data between a host device and a target recording medium, comprising a buffer memory having a matrix of storage locations for storing digital data;

a write interface unit for transferring data to a target recording medium for recording;

a read interface unit for reading and processing data from a target recording medium; and a buffer interface control unit for transferring data between the host device and the buffer memory, for transferring data from the buffer memory to the write interface unit during a writing mode of operation, and for transferring data from the read interface unit to the buffer memory during a retrieval mode of operation, wherein the buffer interface control unit comprises a target direct memory access (DMA) unit for transferring the data from the buffer memory to the write interface unit, wherein the target DMA unit includes means for accessing a first set of prescribed buffer memory storage locations in a predetermined noncontinuous sequence in order to retrieve the data from the buffer memory in a format that includes open time slots interspersed with time slots occupied by the retrieved data for the insertion of code characters pertaining to said data retrieved from the buffer memory.

15. A system according to claim 14, wherein the write interface unit comprises means for generating error code characters pertaining to said retrieved data, means for inserting said generated error code characters in said open time slots interspersed with said retrieved data, and means for processing the interspersed data and error code characters for transfer to the target recording medium in a predetermined data recording format; and wherein the target DMA unit includes means for transferring data read by the read interface unit to the buffer memory for storage in the same buffer format during the retrieval mode of operation as the buffer format said data was retrieved from by the target DMA unit during the writing mode of operation, and means for transferring error code characters read by the read interface unit during the retrieval mode of operation to the buffer memory for storage in predetermined storage locations within a corresponding second set of prescribed storage locations within said buffer format.

16. A system according to claim 14, wherein the write interface unit comprises means for generating error code characters pertaining to said retrieved data, means for inserting said generated error code characters in said open time slots interspersed with said retrieved data, and means for processing the interspersed data and error code characters for transfer to the target recording medium in a predetermined data recording format;

wherein said predetermined data recording format includes sectors of data separated by synchronization code characters and containing error code characters pertaining to the data in such sector;

wherein the read interface unit comprises means for reading whatever is being recorded on the target recording medium while recording is taking place, means for processing error code characters read from the recording medium to detect errors in recording, and means for indicating sectors in which a recording error is detected;

wherein the target DMA unit comprises means that respond to said sector-error indication during the writing mode of operation by again transferring to the write interface unit from the buffer memory the sector of data for which the error was indicated; and wherein the buffer interface control unit further comprises means that respond to said sector-error indication by accessing the buffer memory and inserting control information in said sector of again-transferred data indicating that said sector is being rerecorded on said target recording medium.

17. A system according to claim 16, wherein the target DMA unit includes means for transferring data read by the read interface unit to the buffer memory for storage in the same format during the retrieval mode of operation as the format said data was retrieved from by the target DMA unit during the writing mode of operation, and means for accessing the corresponding first set of prescribed buffer memory storage locations in a second predetermined sequence that is dependent upon said rerecorded-sector indication to ultimately store the sector of rerecorded data instead of the erroneously recorded sector of data in the storage locations of said format corresponding to the storage locations that said rerecorded data was retrieved from during the writing mode of operation.

18. A system according to claim 14, wherein the write interface unit comprises means for generating error code characters pertaining to said retrieved data, means for inserting said generated error code characters in said open time slots interspersed with said retrieved data, and means for processing the interspersed data and error code characters for transfer to the target recording medium in a predetermined data recording format;

wherein the read interface unit comprises means for processing the error code characters read from the recording medium during the retrieval mode of operation to detect errors in recording, and means for indicating sectors in which a recording error is detected;

wherein the target DMA unit includes means for transferring data read by the read interface unit to the buffer memory for storage in the same format during the retrieval mode of operation as the format said data was retrieved from by the target DMA unit during the writing mode of operation; and wherein the buffer interface control unit further comprises means that respond to said sector-error indication during the retrieval mode of operation by retrieving from the buffer memory each sector of data for which said sector-error was indicated, by processing said retrieved data sector to correct said error, and by storing said corrected data sector in the buffer memory in the same storage locations that the error-indicated data sector was retrieved from.

19. A system according to claim 15, wherein the write interface unit comprises means for generating error code characters pertaining to said retrieved data, means for inserting said generated error code characters in said open time slots interspersed with said retrieved data, and means for processing the interspersed data and error code characters for transfer to the target recording medium in a predetermined data recording format;

wherein said predetermined data recording format includes sectors of data separated by synchronization code characters and containing resynchronization code characters at different positions within each sector;

wherein the read interface unit comprises means for detecting synchronization code characters and resynchronization code characters read from the recording medium during the retrieval mode of operation, and means for indicating whether the synchronization code characters and the resynchronization code characters are detected;

wherein the buffer interface control unit further comprises means for monitoring said synchronization code character detection indications during the retrieval mode of operation, and means for responding to said monitoring by providing a synchronization indication for those sectors for which the synchronization code characters are detected and by providing a loss of synchronization indication when synchronization code characters are not detected when they should be detected; and wherein the target DMA unit includes means for transferring data read by the read interface unit to the buffer memory for storage in the same buffer format during the retrieval mode of operation as the buffer format said data was transferred from by the target DMA unit during the writing mode of operation when said synchronization indication is provided, means for responding to said loss of synchronization indication by interrupting all transfer from the read interface unit to the buffer memory, means for responding to an indication that a said resynchronization code character was not detected when it was supposed to be detected by interrupting all transfer from the read interface unit to the buffer memory, and means for responding to a subsequent indication that a resynchronization code character was detected when it was supposed to be detected by resuming transfer of the remainder of the data in the sector to the storage locations in the buffer format corresponding to the storage locations that said data was retrieved from during the writing mode of operation.

20. A system according to claim 14, wherein the target DMA unit includes means for transferring data read by the read interface unit to the buffer memory for storage in the same format during the retrieval mode of operation as the format said data was transferred from by the target DMA unit during the writing mode of operation.

21. A system according to claim 20, wherein the buffer interface control unit further comprises means for selectively generating control information indicating that data is to be read from the target recording medium during the retrieval mode of operation in the reverse direction in relation to a forward direction in which the data was recorded during the writing mode of operation;

wherein the read interface unit includes means that respond to said reverse-direction control information by reading the recording medium in said reverse direction during the retrieval mode of operation; and wherein the target DMA unit includes means for accessing the corresponding first set of prescribed buffer memory storage locations in a predetermined sequence that is dependent upon said reverse-direction control information in order to store the data in the same format that said data would have been stored in if the data had been read from the recording medium in the forward direction.

* * * * *